Nov. 29, 1927.  
C. T. FAAS  
1,651,020  
GARBAGE CONTAINER  
Filed July 21, 1926
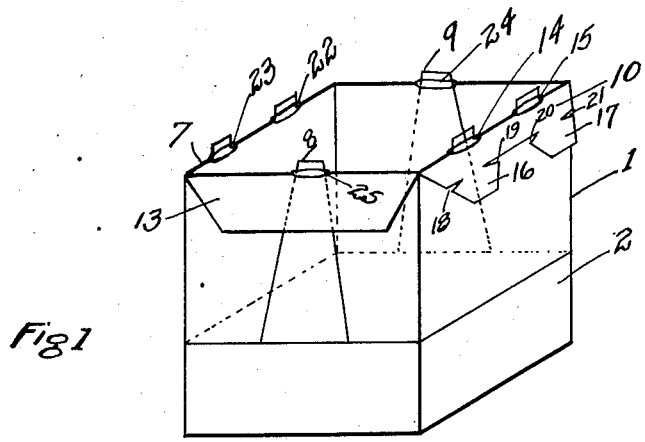
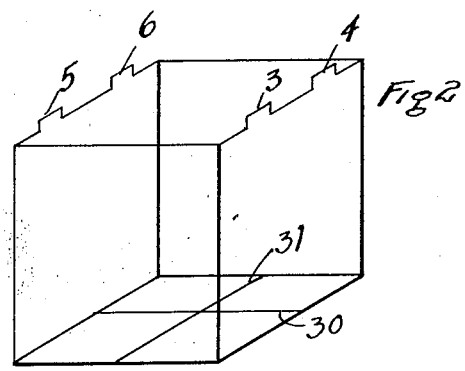
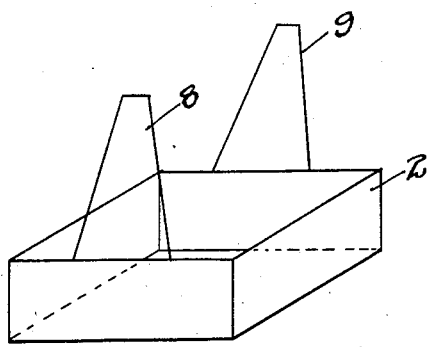
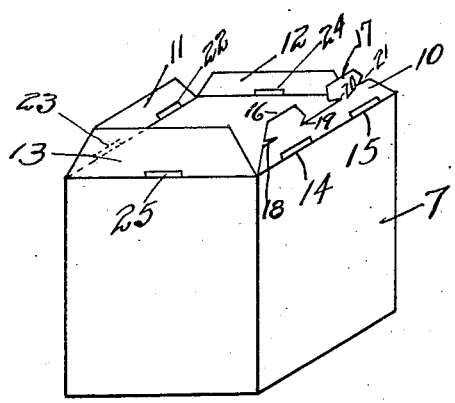
Charles T. Faas  
INVENTOR.  
BY Stuart Scharf  
ATTORNEYS.

Patented Nov. 29, 1927.

1,651,020

UNITED STATES PATENT OFFICE.

CHARLES T. FAAS, OF RIDGEWOOD, NEW JERSEY.

GARBAGE CONTAINER.

Application filed July 21, 1926. Serial No. 124,014.

This invention relates to receptacles for garbage or refuse and has for its object to provide a sanitary lining for such receptacles which lining may be removed with the contents of the receptacle, thus keeping the inner surface of the receptacle clean and free from germs.

Another object of this invention is to provide means of the kind described which may be made of inexpensive material and yet have the requisite strength and durability.

A further object of this invention is to provide a simple means of lifting the garbage container without undue force at the upper end.

A further object of this invention is to provide means which will hold the upper flaps of the container in open position.

A further object of this invention is to provide means for interlocking the upper ends of the container.

Other objects will appear as the description proceeds.

The invention will be first hereinafter described in connection with the accompanying drawing, which constitutes a part of this specification, and then more specifically defined in the claims at the end of the description.

In the accompanying drawing, wherein similar reference characters are used throughout the several views to designate corresponding parts:—Figure 1, is a composite view, showing the various components forming this invention.

Figure 2 is a view showing the outer framework.

Figure 3 is a view of the basket.

Figure 4 is a view of the container.

Referring more particularly to the drawing, 1 designates the framework which supports the basket 2. The framework is made of pressed steel or other metal with outward projections 3, 4, 5, and 6 the purpose of which will be hereinafter explained.

The basket 2, made in any convenient form, preferably of sheet-tin or wires which will act as a protector to the container 7. The basket has at two opposite ends handles 8 and 9 made of stout pressed steel or wires and connected to basket by welding or soldering as desired. The base of the basket is also made of criss-cross wire, or sheet-tin.

The container 7 is preferably made of paper treated with paraffin or the like to make it impervious to water. The upper portion of the container is provided with four flaps 10, 11, 12, and 13.

The flap 10 is provided with two slots 14 and 15 cut along the edge where the flap meets the side of the container. The upper end of the flap 10 is cut to form two tabs 16 and 17. Slits or notches 18, 19, 20, and 21 are cut at the bottom of the tabs for a purpose to be hereinafter described.

Flap 11 is provided with slots 22 and 23.

Flaps 12 and 13 are provided with slots 24 and 25.

In arranging the device for use, the basket 2 is set and supported within the framework 1. The container 7 is next placed so the bottom of same rests on bottom of the basket. The flap 10 is bent over so the projections 3 and 4 go through the slots 14 and 15. The flap 11 is bent over so that the projections 5 and 6 go through slots 22 and 23. Flap 12 is bent over so that handle 9 goes through slot 25.

In the above position it will be seen that the flaps are properly taken care of and they will not interfere with the garbage that is thrown into it.

The function of the slits at the bottom of the tabs is to provide an interlocking means and is achieved as follows: After the container is filled with garbage it is removed from the basket and from the framework. The flaps 12 and 13 are bent inwards and the flaps 10 and 11 are interlocked by inserting the tab 17 into the slot 22. After insertion of the tab it is given a twist of about 90 degrees. The same operation is done to tab 16 in its corresponding slot 23.

The container of course can be supported securely by means of the projections heretofore mentioned.

The basket 2 is supported within the framework either by the thickness of the metal comprising the framework or by means of two cross wires 30, and 31 as shown in Fig. 2.

What I claim is:

In a device of the class described, a framework having projections, a basket supported within the framework, said basket having handles and a container having slots fitting around said projections and handles.

Signed at New York in the county of New York and State of New York.

CHARLES T. FAAS.